United States Patent [19]

Wollschläger et al.

[11] Patent Number: 4,878,828
[45] Date of Patent: Nov. 7, 1989

[54] CLOSING DEVICE FOR MANUFACTURING ARTICLES OF THERMOPLASTIC MATERIAL

[75] Inventors: Dieter Wollschläger, Königswinter; Helmut Scharrenbroich, Neunkirchen-Seelscheid, both of Fed. Rep. of Germany

[73] Assignee: Battenfeld Fischer Blasformtechnik GmbH, Troisdorf/Spich, Fed. Rep. of Germany

[21] Appl. No.: 216,282

[22] Filed: Jul. 7, 1988

[30] Foreign Application Priority Data

Jul. 7, 1987 [DE] Fed. Rep. of Germany ....... 3722340

[51] Int. Cl.⁴ .............................................. B29C 49/56
[52] U.S. Cl. ..................................... 425/541; 425/589
[58] Field of Search .................... 264/328.11; 425/574, 425/575, 589, 541

[56] References Cited

U.S. PATENT DOCUMENTS 4,248,582 2/1981 Martin, Jr. .......................... 425/532
4,606,717 8/1986 Polak et al. .......................... 425/541

FOREIGN PATENT DOCUMENTS 0095008 11/1983 European Pat. Off. .

Primary Examiner—Jay H. Woo
Assistant Examiner—Timothy W. Heitbrink
Attorney, Agent, or Firm—Toren, McGeady & Associates

[57] ABSTRACT

A closing device for molds for the manufacture of articles of thermoplastic material. Two die plates are linearly displaceable on guide beams and movable by means of a power drive in opposite directions relative to each other. The device includes a frame with at least one tension rod, a compression rod and two yokes connecting the ends of the rod. The rods extend parallel to and the yokes extend transversely of the direction of displacement of the die plates. One yoke has a cantilever arm with which it acts directly on one of the die plates. The other yoke is connected with the second die plate with the intermediate arrangement of the power drive. The frame with the power drive is suspended in a housing which is fixed with respect to space. The housing supports the guide beams which are independent of the frame. The yokes of the frame act at least at the die plates and/or at the power drive arranged between a yoke and a die plate through support elements whose axial planes are located on the line of application of the closing force between the two die plates.

12 Claims, 2 Drawing Sheets

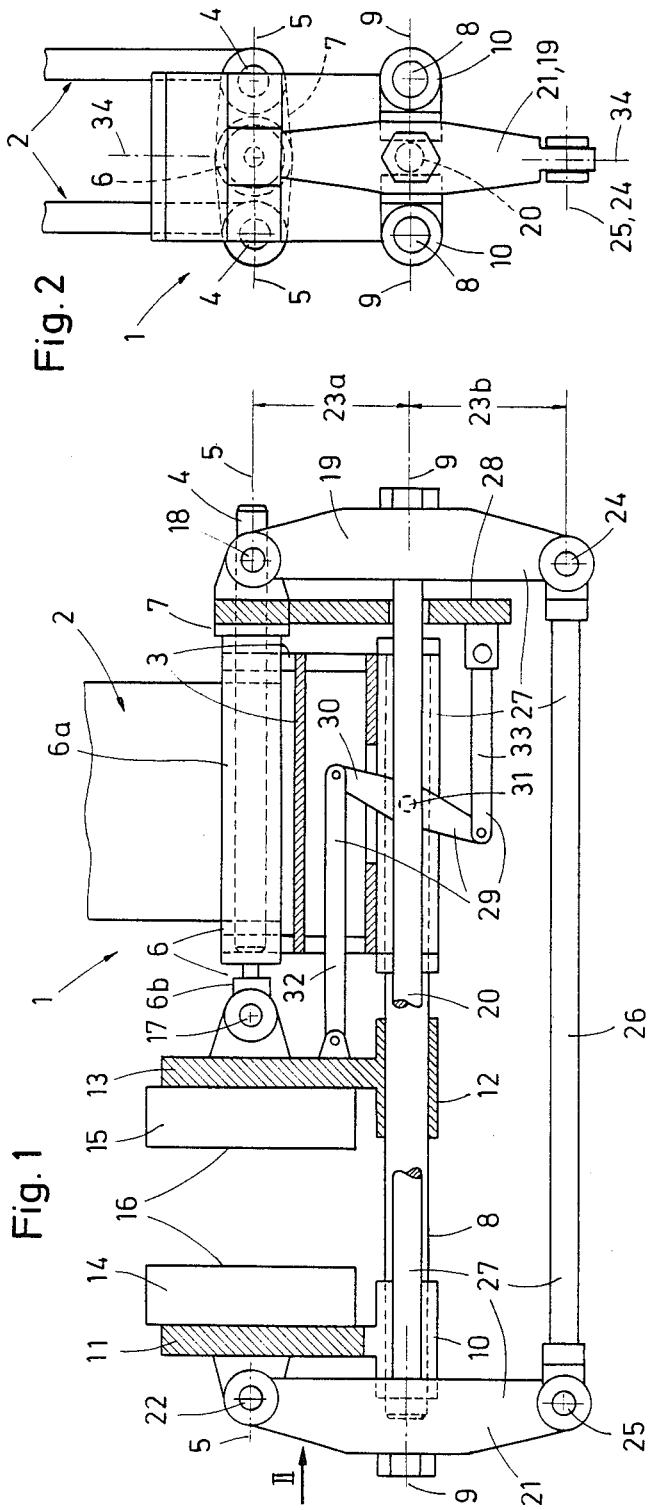

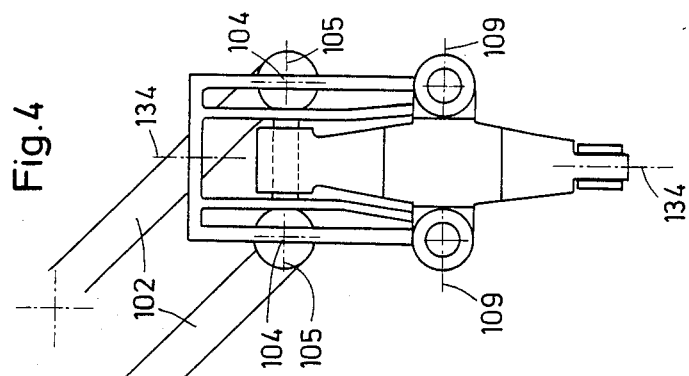
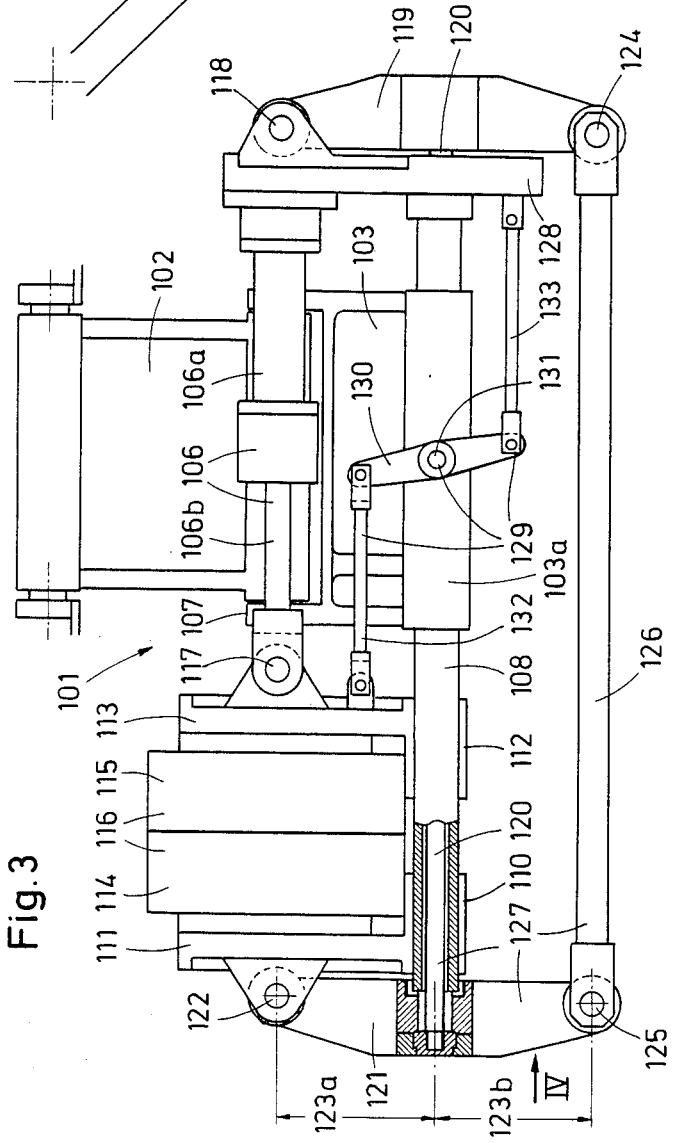

CLOSING DEVICE FOR MANUFACTURING ARTICLES OF THERMOPLASTIC MATERIAL

BACKGROUND OF THE INVENTION

1. Field of the Invention

The present invention relates to a closing device for molds for the manufacture of articles of thermoplastic material, particularly for blow molding of hollow articles in blow molding machines. The device includes two die plates which are linearly displaceable on guide beams and can be moved by means of a power drive, for example, a synchronizing unit in opposite directions relative to each other. The device further includes a frame with at least one tension rod, a compression rod and two yokes connecting the ends of the rods. The tension rod and the compression rod extend parallel and the yokes extend transversely of the direction of displacement of the die plates. One yoke has a cantilever arm with which it acts directly on one of the die plates. The other yoke is connected to the second die plate with the intermediate arrangement of the power drive.

2. Description of the Prior Art

A closing device of the above-described type is known from U.S. Pat. No. 4 248 582. The device has four beams which are arranged underneath the mold and are located symmetrically relative to a vertical center plane extending in closing direction. The lines of application of the closing forces supplied by the power drive coincide with this vertical center plane. The four beams are arranged in two horizontal planes one above the other, however, the die plates are guided only on the beams in the upper horizontal plane. The lower beams of this closing device act as support elements for devices which are used for moving the entire closing device from an extruder station into the blow station and vice versa.

By arranging a synchronizing unit with the two die plates, the known closing device ensures that the existing power drive or closing motor moves the two die plates or the two mold halves connected to the die plates exactly toward each other and apart from each other by exactly half the travel path. However, this known closing device has the disadvantage that the closing forces acting on the mold halves through the two die plates result in deformations of the elements transmitting the forces, particularly of the guide beams for the die plates, so that the closing position of the two mold halves and the manner of operation of the mold halves may be substantially impaired.

European patent No. 0 095 008 discloses a closing device in which the closing pressure for the two mold halves is to be made uniform even in the case of large molds by using weak beams and closing motors. In addition, special measures are taken for preventing undesirable deformations of the elements which transmit the closing force. In this device, three beams are provided which extend through the two die plates. Two of these beams are located in an upper horizontal plane and symmetrically relative to a vertical plane, while the third beam extends along the line of intersection of the horizontal plane and the vertical plane. Moreover, a connection which is pivotable about a horizontal axis is provided between one of the die plates and the corresponding mold half.

However, practical experience has shown that all these measures suggested in European patent No. 0,095,008 for preventing the above-described deformations are not successful. This is because it has been found that the die plates having the pivotable connection with one of the mold halves cannot meet the requirements with respect to being free of deformation in all respects because this die plate not only has to operate as a guide but must also apply the closing force. Accordingly, the guide beams are subjected to bending forces.

It is, therefore, the primary object of the present invention to improve a closing device of the above-described type, so that the guidance of the die plates and the means for applying the closing force are uncoupled from each other in an efficient and space-saving manner.

SUMMARY OF THE INVENTION

In accordance with the present invention, the frame with the power drive is suspended in a housing which is immovable or fixed with respect to space. The housing supports the guide beams which are independent of the frame. The yokes of the frame act at least at the die plates and/or at the power drive arranged between a yoke and a die plate through support elements whose axial planes are located on the line of application of the closing force between the two die plates.

In accordance with a particularly useful feature of the present invention, the support elements are joints.

It has been found particularly advantageous to connect the yokes of the frame also with the compression rod by means of joints.

In accordance with another advantageous further development of the invention, the power drive is connected to the second die plate also through a joint whose axial plane is located on the line of application of the closing force.

In accordance with another feature of the present invention, the housing supports a bearing for the reversing member of the synchronizing unit.

In accordance with another feature, pairs of guide beams may be provided for the die plates. The tension rod of the frame may be provided between the two guide beams for the die plates. Preferably, the tension rod is located in the same axial plane as the guide beams.

In accordance with another embodiment of the closing device according to the present invention, the frame has two parallel tension rods each of which is surrounded with radial play by a hollow guide beam.

In accordance with another feature, the power drive is arranged above the guide beams but centrally between the guide beams and the tension rods.

In accordance with another embodiment, the power drive may be arranged on the same level as the guide beams for the housing and centrally between the guide beams.

In accordance with an important feature of all embodiments of the closing device according to the present invention, the element of the power drive acting on the frame has a cantilever member, the part of the synchronizing unit facing the frame acting on the cantilever member.

Moreover, the guide beams may be supported in the housing so as to be axially movable and may be connected at one end to the cantilever member.

All embodiments of the closing device of the invention have in common that the frame effecting the transmission of the closing force may freely deform without having a negative influence on the guidance of the die plates. Another advantage is that the exact oppositely directed movement of the die plates is maintained even if the frame is deformed under the influence of the closing force because the synchronizing unit is connected to the frame at a location which is not subjected to deforming forces.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawing:

FIG. 1 is a side view, partly in section, of a closing device according to the present invention for molds for manufacturing hollow articles in blow molding machines;

FIG. 2 is a front elevational view of the closing device of FIG. 1, seen in the direction of arrow II:

FIG. 3 is a side elevational view, partly in section, of another embodiment of a closing device for molds for manufacturing hollow articles in blow molding machines; and FIG. 4 is a front elevational view of the closing device of FIG. 3, seen in the direction of arrow IV.

DETAILED DESCRIPTION OF THE INVENTION

FIGS. 1 and 2 of the drawing show a closing device 1 for molds for manufacturing hollow articles of thermoplastic material in blow molding machines.

However, such a closing device 1 could also be used for molds in which articles are manufactured from thermoplastic material in different manners, for example, by injection molding.

The closing device 1 is mounted in a machine stand so as to be pivotable, for example, in its entirety through parallelogram links 2.

However, the closing device 1 may also be moved in a different manner, for example, through inclined beams, relative to the different work stations receiving the closing device 1.

In the closing device 1 according to FIGS. 1 and 2, the parallelogram links 2 are hinged to a housing 3 through or suspension members 4 which extend parallel in longitudinal direction of the housing. The suspension members 4 are located spaced apart on a common horizontal plane 5—5.

The housing 3 includes a power drive 6, for example, a hydraulic or pneumatic piston-cylinder unit, arranged between the two suspension members 4. The power drive 6 is a closing motor whose longitudinal axis is preferably located in the middle between the suspension members 4 on the common horizontal plane 5—5, as clearly shown in FIG. 2. The cylinder housing 6a of the power drive 6 is longitudinally movable relative to the housing 3. The housing 6a is also supported on the suspension members 4 by means of guide plates 7 which are located at least in the vicinity of the rearward end of the cylinder housing 6a.

Housing 3 further includes two parallel guide beams 8 which are arranged at a distance below but parallel to the suspension members 4. Guide beams 8 are located in a common horizontal plane 9—9 and extend on one end beyond housing 3, as can be seen in FIG. 1.

A first die plate 11 is longitudinally movably guided on the two lower guide beams 8 of the housing 3 through two sleeve members 10. Through two similar sleeve members 12, a second die plate 13 is also longitudinally movably mounted on the guide beams 8.

The two die plates 11 and 13 extend at a right angle to the longitudinal axes of the guide beams 8 and the corresponding sleeve members 10 and 12. The first die plate 11 serves to fasten a mold half 14 and the second die plate 13 is used for fastening a mold half 15 of, for example, a blow mold 16, as it is required for the manufacture of hollow articles of thermoplastic material.

The power drive 6 serving as a closing motor acts through a piston rod 6b on the die plate 13. The piston rod 6b is connected through a joint or support element 17 to the die plate 13. Joint 17 has a horizontal axis which extends transversely of the suspension members 4 but is located on the common axial plane 5—5.

The power drive 6 is connected at the rearward end of its cylinder housing 6a through a joint 18 to a yoke 19. The joint 18 also extends transversely of the longitudinal direction of the two suspension members 4, while the longitudinal axis of the joint 18 is located on the common axial plane 5—5 of the suspension members 4.

The yoke 19 is at one end connected to a tension rod 20 which extends parallel to the guide beams 8 of housing 3. The tension rod 20 is arranged in the middle between the guide beams 8 and is located on the common axial plane 9—9.

A yoke 21 is connected to the other end of the tension rod 20. Yoke 21 corresponds in its construction to yoke 19 but is arranged reversed relative to yoke 19. Yoke 21 is connected through a joint 22 to die plate 11. The axis of joint 22 extends parallel to the axis of the joints 17 and 18 but extends transversely of the longitudinal direction of the suspension members 4 and guide beams 8. The axis of joint 22 is also located on the common axial plane 5—5 of the two upper suspension members 4 of the closing device 1, as can be clearly seen in FIG. 1.

It should be mentioned at this point that the two yokes 19 and 21 are provided with two cantilevering arms 23a and 23b which have the same length but extend in different directions relative to the longitudinal axis of the tension rod 20, as can be seen in FIG. 1 with respect to yoke 19. While joints 18 and 22 are provided at the free ends of the arms 23a of the two yokes 19 and 21, respectively, the free ends of the arms 23b of these yokes 19 and 21 act on a compression rod 26 through joints 24 and 25, respectively, as can be seen clearly in FIG. 1 of the drawing. The joints 24 and 25 which connect the yokes 19 and 21 to the compression rod 26 also extend transversely of the longitudinal direction of the suspension members 4 and the guide beams 8, i.e., they extend parallel to the joints 17, 18 and 22, the position and arrangement of which has already been described above.

The tension rod 20 forms together with the compression rod 26 and the arms 23b of the two yokes 19 and 21 a frame 27 which, in turn, is in continuous operative connection with the two die plates 13 and 11 through the arms 23a of the two yokes 19 and 21 and the joints 17, 18 and 22.

Another operative connection is effected between the housing 3, the die plate 13 and a cantilever member 28 through a synchronizing unit 29. The cantilever member 28 is rigidly connected at the rearward end of the cylinder housing 6a of the power drive 6 and extends essentially parallel to the yoke 19 of the frame 27.

The synchronizing unit 29 has a lever or reversing member 30 with arms of equal length. The lever 30 is attached to housing 3 so as to be capable of angular displacement about a joint or bearing 31. One of the arms of the lever 30 is in adjustment connection to the die plate 13 through a coupling rod 32, while a similar coupling rod 33 connects the other arm of the lever 30 to the cantilever member 28 of the cylinder housing 6a.

When the lever 30 is pivoted about joint 31, the coupling rods 32 and 33 carry out adjustment movements which are oppositely directed to each other. Thus, when the coupling rod 32 carries out a movement from right to left as seen in FIG. 1, the coupling rod 33 moves simultaneously by exactly the same distance from left to right, or vice versa.

An actuation of the power drive 6 and a displacement of the piston rod 6b from the position shown in FIG. 1 toward the left results in a corresponding displacement of the die plate 13 on the guide beams 8 of the housing 3. This movement of the die plate 13 causes the synchronizing unit 29 to be taken along and results in a corresponding horizontal displacement of the cylinder housing 6a on the guide beams 4 toward the right relative to housing 3. Due to the displacement of the cylinder housing 6a on the guide beams 4 toward the right, frame 27 is displaced through yoke 19 from the left toward the right, so that the frame 27 moves the die plate 11 to a corresponding extent from left to right on the guide beams 8 of the housing 3. Thus, the two die plates 11 and 13 with the mold halves 14 and 15 of the blow mold 16 fastened thereto move toward each other along the guide beams 8 of the housing 3 until the two mold halves 14 and 15 meet each other at the dividing plane of the mold to create a closing pressure. The resulting closing forces occurring between the two mold halves 14 and 15 have a line of application which is located on the common horizontal plane 5—5 of the two upper suspension members 4 and, therefore, coincides with the axial planes of the joints 17, 18 and 22.

The closing forces generated by the power drive 6 are introduced into the frame 27 through the arms 23a of the two yokes 19 and 21 and are absorbed by the frame 27. However, deformations occur only in the frame 27 itself and the location of the frame with respect to space is affected. Not affected are the guide beams 8 for the two die plates 11 and 13 and the two suspension members 4 for the relative movement of the power drive 6 relative to the housing 3. Thus, the guide elements of the device are completely uncoupled from the force-transmitting elements, resulting in an optimum operation of the entire closing device 1.

Since the synchronizing unit 29 only coordinates the relative displacement between frame 27 and die plate 13 and the housing 3 of the closing device 1 in dependence upon the power drive 6, the synchronizing unit 29 is also uncoupled from the application of the closing force and, therefore, the synchronizing unit 29 only has to absorb the relatively low closing forces.

The synchronizing unit 29 can also be constructed differently from the one illustrated in the drawing. For example, a pinion rotatable about the axis 31 could be arranged so as to mesh with two oppositely displaceable racks, wherein one of the racks is connected to the die plate 13 and the other rack is fixedly connected to the cantilever member 28.

FIG. 2 of the drawing clearly shows that the yokes 19 and 21 of the frame 27 move on a vertical plane 34—34 which is located in the middle between the pairs of suspension members 4, 4 and guide beams 8, 8 arranged one above the other. The tension rod 20 and the compression rod 26 of the frame 27 also perform their displacement relative to housing 3 of the closing device 1 on this vertical plane 34—34. This results in a structurally compact and operationally robust construction of the entire closing device 1.

The closing device 101 illustrated in FIGS. 3 and 4 of the drawing is a modification of the closing device 1 shown in FIGS. 1 and 2. All components which correspond structurally and/or operationally to those of the embodiment shown in FIGS. 1 and 2 have the same reference numerals, but increased by the number 100.

The closing device 101 shown in FIGS. 3 and 4 is structurally and operationally identical to the ones shown in FIGS. 1 and 2 with the following exceptions.

In the closing device 101 according to FIGS. 3 and 4, the guide beams 108 are axially displaceably mounted in the housing 103 which is suspended from parallelogram links 102 at joints 104. The guide beams 108, in turn, serve to displaceably guide the die plates 111 and 113 by means of sleeve members 110 and 112.

The guide beams 108 are hollow sections, preferably pipes. As the lefthand side of FIG. 3 clearly shows, a tension rod 120 extends through each guide beam 108 with radial play. Each of the two tension rods 120 is connected to yoke 119 with one end and to the yoke 121 with the other end.

The radial play between the inner circumference of the guide beams 108 and the tension rods 120 extending through guide beams 108 is dimensioned such that any bending deformations of the tension rods 120 and any vertical displacement of the frame 127 relative to the housing caused by the deformation of the frame 127 and the arms 123a do not have any deforming influence on the guide beams 108.

One end of each guide beam 108 is mounted axially fixed on the cantilever member 128 which projects laterally from the rearward end of the cylinder housing 106a and extends essentially parallel to yoke 119 of frame 127. The other end of each guide beam 108 extends into the region of the yoke 121, however, this other end is mounted with axial play relative to the yoke 121, wherein the play is effective at least in axial direction.

The synchronizing unit 129 moves the cantilever member 128 and the die plate 113 in opposite directions relative to each other and relative to housing 103. The guide beams 108 axially displaceably mounted in the guide sleeves 103a are moved relative to housing 103 in the same manner as the frame 127.

When the guide beams 108 are fixed to housing 103, the entire system has a greater structural length than when the guide beams 108 are movable together with the frame, as discussed above.

It is an advantage in the closing device according to FIGS. 3 and 4 that the tension rods 120 are not located in the middle underneath the die plates 111 and 113 or mold halves 114 and 115, but are laterally offset from this middle, as are the guide beams 108.

Therefore, when the blow mold 116 is opened, the region underneath the mold is not occupied by the guide beams 108 or the tension rods 120.

Finally, it should be noted that the fixed support of the housing 3 or 103 with respect to space relative to the machine unit of the blow molding machine or the injection molding machine, not shown, is effected by the parallelogram links 2 or 102 or other suitable support and/or guide elements acting on the housing because the latter are guided relative to the machine unit.

While specific embodiments of the invention have been shown and described in detail to illustrate the application of the inventive principles, it will be understood that the invention may be embodied otherwise without departing from such principles.

We claim:

1. In a closing device for molds for manufacturing articles of thermoplastic material, the device including guide beams and first and second die plates which are linearly displaceable on the guide beams in a direction of displacement, and a power drive for moving the guide beams in opposite directions relative to each other, the device further including a frame comprising at least one tension rod, a compression rod and first and second yokes connecting the at least one tension rod and the compression rod, the at least one tension rod and the compression rod extending parallel to the direction of displacement and the yokes extending transversely of the direction of displacement of the die plates, the first yoke including a cantilever arm for acting directly on the first die plate, the second yoke being connected to the power drive, the power drive being connected between the second yoke and the second die plate, the improvement comprising a fixed housing which is fixed with respect to space, the housing supporting the guide beams independently of the frame, suspension means for supporting the frame wherein the power drive is arranged in the housing, support elements connected to the yokes of the frame, the yokes acting on at least one of the first die plate and the power drive through the support elements, wherein the support elements have axial planes which are located on a line of application of a closing force between the two guide plates.

2. The closing device according to claim 1, wherein the support elements are joints.

3. The closing device according to claim 1, comprising connecting joints for connecting the yokes of the frames with a compression rod.

4. The closing device acording to claim 2, comprising an additional joint for connecting the power drive with the second die plate, the additional joint having an axial plane which is located on the line of application of the closing force between the two die plates.

5. The closing device according to claim 1, wherein the power drive is a synchronizing unit including a reversing member, the housing including a bearing for the reversing member.

6. The closing device according to claim 1, wherein two guide beams are provided for the die plates.

7. The closing device according to claim 6, wherein the at least one tension rod is located between the two guide beams.

8. The closing device according to claim 7, wherein the guide beams are located on an axial plane and the at least one tension rod is located on the same axial plane as the guide beams.

9. The closing device according to claim 1, wherein the frame includes two parallel tension rods, the guide beams being hollow members, each guide beam surrounding a tension rod with radial play.

10. The closing device according to claim 9, wherein the power drive is located above the guide beams at equal distances from the guide beams and the tension rod.

11. The closing device according to claim 5, wherein the power drive includes a cantilevering member, the synchronizing unit further including a cylinder housing which extends toward the second yoke and acts on the cantilever member.

12. The closing device according to claim 11, wherein the guide beams are supported axially displaceably in the cylinder housing and an end of each guide beam is connected to the cantilevering member.

* * * * *